Patented Aug. 29, 1933

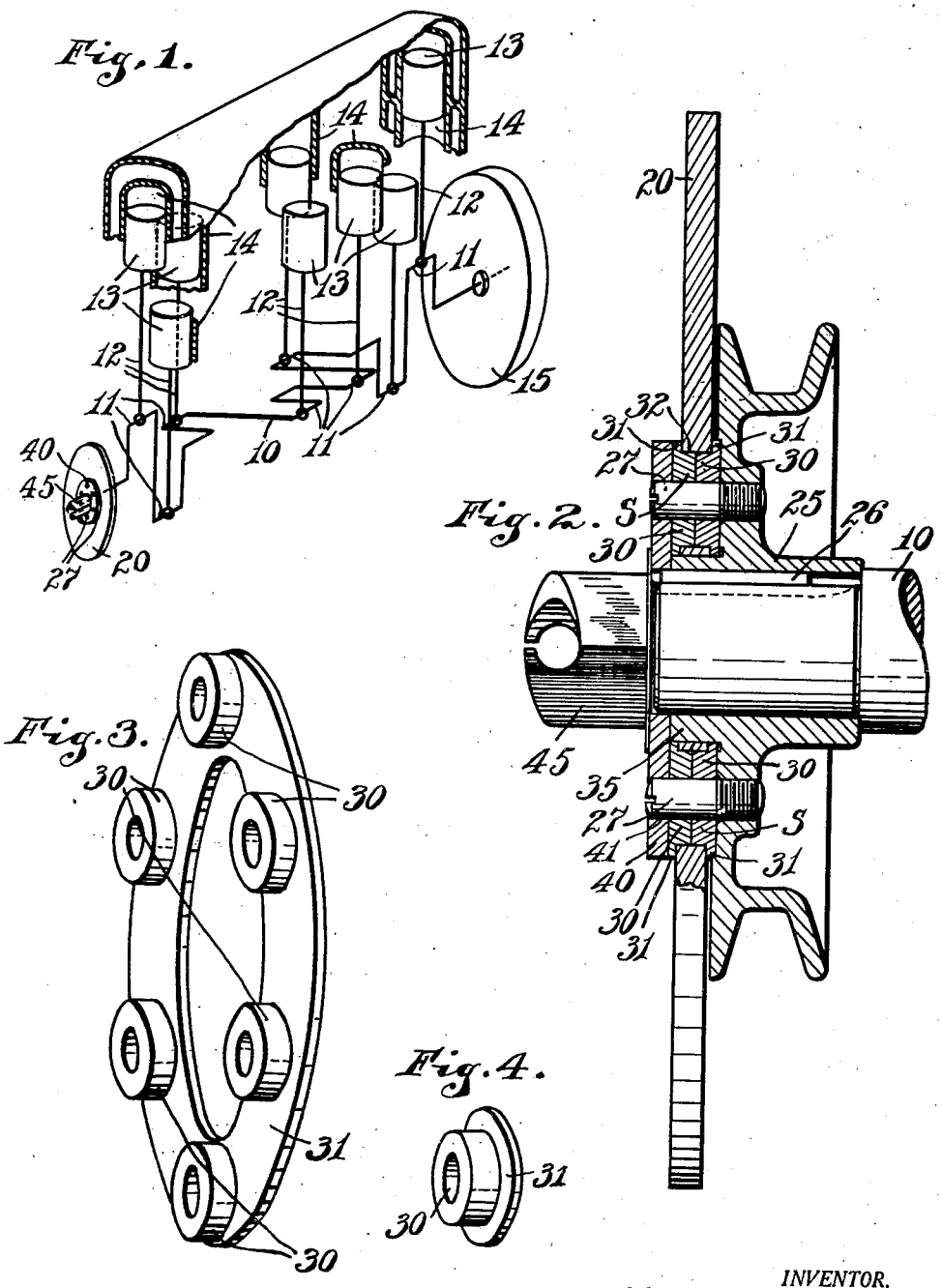

1,925,074

UNITED STATES PATENT OFFICE 1,925,074

VIBRATION DAMPER FOR EXPLOSION MOTORS

Thomas J. Litle, Jr., Indianapolis, Ind., assignor, by mesne assignments, to Packard Motor Car Company, Detroit, Mich., a corporation of Michigan Application July 19, 1928. Serial No. 293,856

16 Claims. (Cl. 74—6)

In the operation of internal combustion engines of the multi-cylinder type, more especially in the use of such engines in motor vehicles, it has been found that, where the crank shaft is equipped only with the usual rigidly-attached fly wheel, there are several critical speeds of crank shaft rotation at which undesirable angular vibrations of the crank shaft are set up.

The object of my present invention is to produce an inexpensive, readily applied, damper which may be attached to the crank shaft and of such character as to be effective to prevent the setting up of undesirable angular vibrations in the crank shaft practically throughout the entire normal range of speeds of the shaft, the device being of such character as to be automatically effective at all critical speeds and such as not to require adjustments from time to time, and such as to be automatically self restoring to initial and normal position.

The accompanying drawing illustrates my invention.

Fig. 1 is a diagrammatic illustration of an embodiment of my invention;

Fig. 2 an axial section, substantially about full size, of a form of my damper which has been found to be satisfactory in actual practice;

Fig. 3 a perspective of one of the rubber units, and

Fig. 4 a perspective of a modified form of one of the rubber units.

In the drawing 10 indicates a crank shaft of ordinary form having a plurality of cranks 11 each carrying a pitman 12 which is associated with a piston 13 and a cylinder 14.

Rigidly secured to this crank shaft, most conveniently at its rear end, is the usual fly wheel 15, the inertia value of which will, as usual, be dependent upon the size of the engine, the character of load, number of cylinders and other conditions well known to engine designers.

My damper comprises a comparatively light vibration element 20 which, as compared with the crank shaft, may be considered as an oscillating, and perhaps laterally vibrating, disk or diaphragm which is statically and dynamically balanced on the axis of the shaft. This element 20 is most conveniently in the form of a metal disk which in practice I have found may be conveniently made of sheet metal in the neighborhood of ¼" thick depending upon the size of the engine. I am not prepared to say just how heavy or just how light this disk must be as compared with the engine and usual fly wheel with which it is to be associated but I have found that if the element is too heavy it is not as effective and if it is too light it is not as effective. In practice I have found that an engine whose crank shaft weighs about 60½ lbs. requires a damper disk weighing about 1 lb.

The disk 20 is rotatably associated with crank shaft 10 by means of rubber sleeves or spools S by means of which the disk is permitted a desired freedom of angular and axial movement relative to the crank shaft, this movement being of comparatively small range and quickly responsive to forces tending to produce movement of either the disk or the crank shaft one relative to the other. The rubber should be actively resilient and initially yieldable to small forces.

In the form shown in the drawing I utilize the fan-belt-pulley 25, which is keyed at 26 to the forward end of the crank shaft, as a support or base for my improved damper and, therefore, provide this pulley with a circular series of pins 27 arranged parallel with the axis of the crank shaft. The spools S are formed by pairs of short bosses 30 having flanges 31 at one end. Most conveniently a series of bosses 30 and flanges 31 are integral as shown in Fig. 3, the bosses having a slipping fit in perforations or cavities 32 in disk 20 and over pins 27 and having an axial extent approximately half the thickness of the disc 20, the flanges 31 engaging the opposite faces of the disk 20; or the bosses may be of the form shown in Fig. 4 each with its own flange 31'.

These spools S may be formed in other ways if desired. Sensitively yielding and recovering material other than rubber may be used but I believe good rubber to be the best.

The hub 35 of pulley 25 on which the disk element 20 is journaled is given a length slightly less than the normal axial length of the spools S. The parts are clamped in place by means of a clamping ring 40 provided with a circular series of perforations 41 to receive the ends of pins 27 and a radial dimension sufficient to overlie the outer ends of the spools S and to engage the end of hub S. This clamping ring 40, in the form shown in the drawing, is firmly clamped upon the end of hub 35 by means of the nut 45 which serves to also hold the fan pulley 26 in place and to compress the spools S sufficiently to cause the bosses 30 to fill the annular spaces between the perforations 32 of disk 20 and pins 27 and to partially restrain the rubber in such manner that there is obtained a desired resistance to angular and axial movement of the disk relative to the shaft. I am not able to state just how much confinement should be given to the rubber except to say that the rubber must not be absolutely confined because then no relative movement could be obtained because rubber when completely confined is substantially incompressible, but a very little experiment will determine the most efficient length of hub 35, the principal desirable feature being that the means for associating the rubber elements with the disk and the carrier for the disk shall be definitely proportioned parts which may be firmly brought to operative position and will not need or permit adjustment from time to time.

Satisfactory results may also be obtained by cementing or vulcanizing the rubber to the disk 20 and to the carrier for the disk comprising the pulley 25.

In practice I have found that when the ordinary crank shaft of an internal combustion engine is equipped with my improved damper, the engine may be driven throughout its entire commerical range of speed without causing, at any speed, any objectionable angular vibrations. I am not prepared to say what the coaction of the parts is but I do know that if the parts are properly proportioned (and my previous statement of relative weights is indicative of what those proportions should probably be), there is no "critical" speed in the operation of the engine.

I am inclined to believe that the distinguishing characteristics of my device is that the period of vibration of the resilient mounting for the disk or diaphragm is very high and the amplitude is very slight and is very sensitive to small applied forces.

My experiments have also indicated that the period of vibration of the damper disk must be small, that is to say, the disk must be comparatively light so that the reaction of the disk is immediately responsive to any tendency of other portions of the apparatus to produce undesirable angular vibrations in the crank shaft, thus preventing the production of undesirable angular vibrations of the shaft or at least damping such vibrations before they reach an amplitude which is noticeable. It should be remembered, in this connection, that where the shaft comprises an axial series of cranks, there is a tendency to set up a whipping of the shaft and I am inclined to believe that the ability of the disk or diaphragm 20 to vibrate axially of the shaft is an important contribution to the ultimate damping effect which it has in practice.

I claim as my invention:

1. A vibration damper for a crank shaft comprising a support rigidly attached to the shaft and having a hub, a comparatively light disk of uniform section centrally pierced to receive said hub and of less thickness than the hub length, and having a circular series of perforations, a circular series of pins carried by said support and projected through said perforations, rubber elements mounted in said perforations and around the pins, a clamping ring adapted to engage the hub end, and rubber cushions integral with said sleeves interposed between the disk and the support and clamping ring respectively.

2. A structure of the character defined by claim 1 wherein the rubber elements are formed by pairs of bosses having an integral flange at one end.

3. A structure of the character defined by claim 1 wherein the rubber elements are two rubber rings each carrying on one face a circular series of perforated bosses.

4. A vibration damper for engine crank shafts comprising a support formed for non-rotative mounting on such shaft and having a hub at one end, a comparatively light damped disk of uniform section thinner than the length of said hub centrally pierced to receive said hub and having a circular series of perforations, a circular series of pins carried by the support and arranged to lie in the perforations of the disk, rubber elements in each of said perforations around the associated pin and having an axial length greater than the thickness of the disk, and a clamping ring contacting with the hub and engaging the exposed ends of the rubber elements to hold them in position.

5. A vibration damper of the character defined by claim 4 wherein the rubber elements comprise portions clamped between the support and one face of the disk and between the clamping ring and the opposite face of the disk.

6. A vibration damper for engine shafts comprising a hub member secured to the shaft, a thin disk journaled on said hub member and having a circular series of perforations, a rubber damping member having integral bosses disposed in said perforations, and means to clamp said damping member between the disk and the hub member and compress said bosses in said perforations.

7. A vibration damper for engine shafts comprising a hub member secured to the shaft, a thin disk journaled on said hub member and having a circular series of perforations, a rubber damping member having integral bosses disposed in said perforations to yieldably connect said disk and hub, and means carried by said shaft to simultaneously compress said bosses an equal amount.

8. A vibration damper for engine shafts comprising a hub member secured to the shaft, an inertia member comprising a thin light disk journaled on said hub member for oscillation at high frequency, a damper member including rubber bosses resiliently connecting the disk to the hub member in driving relation, and means carried by the shaft to simultaneously compress said bosses.

9. A vibration damper for engine shafts comprising a hub member secured to the shaft, an inertia member comprising a thin light disk journaled on said hub member for oscillation at high frequency having a circular series of perforations, a clamping ring axially adjustable on said shaft and having axial holes in alignment with said perforations, rubber damping means including rubber bosses disposed in said perforations and flanges connecting said bosses disposed between the disk and the hub member and clamping ring respectively, and pins carried by said hub member passing through the bosses in said perforations and the holes in said clamping ring.

10. A vibration damper for shafts comprising a supporting member rigidly secured to the shaft, an inertia member comprising a thin disk of uniform section mounted on said support for oscillation about the shaft axis at high frequency, one of said members having a circular series of cavities, and damping means comprising a rubber flange having a circular series of rubber bosses adapted to seat in said cavities, said damping means being clamped between the supporting member and the inertia member.

11. A vibration damper for shafts comprising a supporting member rigidly secured to the shaft, an inertia member comprising a thin disk of uniform section mounted on said support for oscillation about the shaft axis at high frequency, one of said members having a circular series of cavities, and damping means including rubber bosses seated in said cavities and connected to said supporting member, said bosses having flanged portions extending between said supporting member and said inertia member.

12. A vibration damper for shafts comprising a hub member secured to the shaft, a thin light disk journaled on said hub member, a damper member including rubber bosses resiliently connecting the disk to the hub member in driving relation, and means to simultaneously compress said bosses.

13. A vibration damper for shafts comprising a support rigidly secured to the shaft, a thin disk of uniform section mounted on said support for oscillation about the shaft axis at high frequency, one of said elements having a circular series of cavities and damping means comprising a rubber flange having a circular series of rubber bosses adapted to seat in said cavities, said damping means being clamped between the support and said disk.

14. A vibration damper for shafts comprising a support rigidly secured to the shaft, a thin disk of uniform section mounted on said support for oscillation about the shaft axis, one of said elements having a circular series of cavities, and damping means including rubber bosses seated in said cavities and extending between said support and inertia member, connected to said support.

15. A device for resiliently connecting coaxially disposed rotatable members comprising, a rubber member including a flange having integral rubber bosses thereon, each boss having an axially disposed opening, means on one of said members to engage said bosses and means on the other member to engage in said openings.

16. A device for resiliently connecting coaxially disposed rotatable members comprising, a rubber member including a flange having integral rubber bosses thereon, each boss having an axially disposed opening, said bosses and the opening therein being operatively connected to said members.

THOMAS J. LITLE, Jr.